2,715,128
ANTHRONE DERIVATIVES

Paul Grossmann, Binningen, and Walter Kern, Sissach, Switzerland, assignors to Ciba Limited, Basel, Switzerland, a Swiss firm No Drawing. Application July 6, 1953,
Serial No. 366,385

Claims priority, application Switzerland July 16, 1952

9 Claims. (Cl. 260—303)

This invention provides new anthrone derivatives which contain a single anthrone nucleus and a five-membered heterocyclic ring fused on at the 1:9-position, and also contain bound to an α-carbon atom of the six-membered ring which is not connected to the heterocyclic ring an acylamino group which contains the radical of an aliphatic monocarboxylic acid advantageously one of low molecular weight.

Accordingly, the new products contain the radical of the constitution

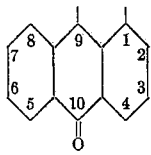

They are made in accordance with the invention by treating an anthrone which contains a single anthrone nucleus and a five-membered heterocyclic ring fused on in the 1:9-position, and also an amino group bound to an α-carbon atom of the six-membered ring not connected to the heterocyclic ring, that is to say in the 5- or 8-position, with an acylating agent capable of introducing an acyl radical which is advantageously the radical of an aliphatic monocarboxylic acid of low molecular weight.

As anthrones of the kind defined above for use as starting materials there come into consideration those containing various five-membered heterocyclic rings, for example, those which contain heterocyclic rings having one or two heteroatoms, and more especially those of which the heterocyclic ring contains two nitrogen atoms or a sulfur atom and a nitrogen atom.

Specially valuable results are obtained with 5-aminoanthrones having a heterocyclic ring fused on at the 1:9-position.

5- and 8-aminoanthrones of the above kind are known, and insofar as they are new they can be made by methods in themselves known. Suitable starting materials are, for example, substitution products containing an —NH$_2$ group in the 5- or 8-position of the following compounds:
1:9-isothiazole-anthrone of the formula

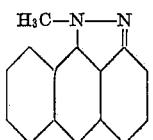

1:9-pyrazole-anthrones, for example, N-methyl-pyrazole-anthrones of the formulae

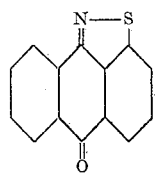

and

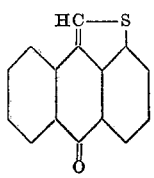

1:9-thiophene-anthrone of the formula

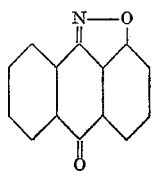

and also 1:9-(N)-isoxazole-anthrone of the formula

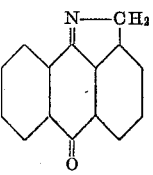

1:9-(N)-pyrrole-anthrone of the formulae

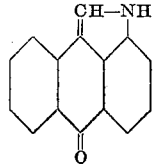

and

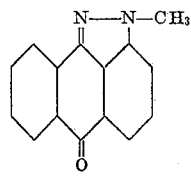

and also the so-called anhydro-anthraquinone-1-sulphonic acid amide of the formula

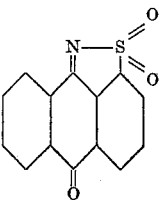

As acylating agents there are used in the process of the invention compounds which are capable of introducing the acyl radical of an aliphatic monocarboxylic acid. The acylating agent is advantageously one which is capable of introducing the radical of an aliphatic monocarboxylic acid containing 2–6 carbon atoms, for example, the radical of valeric acid. Of special interest are acylating agents which are capable of introducing a radical of the formula —CO—C$_n$H$_{2n+1}$, in which $n$ represents a whole number not greater than 3 such, for example, as the radical of acetic acid, propionic acid or butyric acid. However, there may also be used acylating agents capable of introducing a radical of high molecular weight, for example the radical of caproic acid, caprylic acid, lauric acid, palmitic acid, stearic acid or oleic acid. As acylating agents there are used more especially reactive functional derivatives of these acids, for example, their acid halides, and advantageously the chlorides, or their anhydrides.

The acylation may be carried out by methods in themselves known, for example, in an inert organic solvent such as nitrobenzene or chlorobenzene, with advantage in the presence of an acid-binding agent, for example, a tertiary base such as pyridine or dimethylaniline, and advantageously at a raised temperature.

The new anthrone derivatives of this invention, which have the constitution hereinbefore defined, may be used, for example, as pigments. Those derived from carboxylic acids of low molecular weight, especially after being suitably pasted, if desired, in conjunction with reprecipitation, for example, from sulfuric acid, are suitable for dyeing or printing structures composed of cellulose esters, superpolyamides or superpolyurethanes, and if desired structures composed of polyvinyl compounds. They can be used with special advantage for dyeing or printing cellulose acetate artificial silk or nylon, and in this case pure and generally strong yellow tints are obtained, which in some cases are distinguished by an especially good fastness to light.

As the molecular size of the acyl radical increases from 6 carbon atoms upwards, the affinity of the products for cellulose acetate artificial silk decreases, but their solubility in fats, oils, waxes and preparations containing such substances increases, so that the products derived from carboxylic acids of high molecular weight can be used for colouring fatty substances of all kinds, valuable pure yellow tints being likewise obtained.

For some purposes, especially for dyeing cellulose acetate artificial silk there are especially useful mixtures of different anthrone derivatives of this invention. Such mixtures can be obtained either by mixing together previously prepared single compounds or by carrying out the reaction described above with mixtures of different starting materials. For example, mixtures of different anthrone derivatives, for example, those which contain different heterocyclic rings, may be acylated together, or mixtures of different acylating agents may be used, for example, a mixture of acetyl chloride and propionic acid chloride or butyric acid chloride or a mixture of all three of these acid chlorides.

The following examples illustrate the invention, the parts and percentages being by weight:

Example 1

25.2 parts of 5-amino-1:9-isothiazole-anthrone are heated in 100 parts of chlorobenzene at the boil for ½ hour with 12.5 parts of dimethylaniline and 10 parts of propionyl chloride. The mixture is then cooled well, and the dyestuff is filtered off. After being suitably pasted the dyestuff dyes cellulose acetate silk green-yellow tints which are very fast to light.

Instead of 10 parts of propionyl chloride there may be used for the acylation 11.6 parts of butyryl chloride or 11.6 parts of isobutyryl chloride or 13 parts of valeryl chloride.

Mixtures of the aforesaid acid chlorides with acetyl chloride may also be used or the dyestuffs may be mixed together after they have been made, in order to increase the affinity.

Instead of acylating 5-amino-1:9-isothiazole-anthrone, 8-amino-1:9-isothiazole-anthrone can be acylated in the same manner.

Example 2

25 parts of 5-amino-N-methyl-1:9-pyrazole-anthrone of the formula

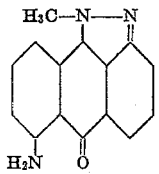

are heated in 100 parts of chlorobenzene at the boil for ½ hour with 12.5 parts of dimethylaniline and 11.6 parts of butyryl chloride. The dyestuff is isolated in the manner described in Example 1. It dyes cellulose acetate artificial silk pure yellow tints.

Instead of butyryl chloride there may be used an equivalent quantity of acetyl chloride, propionyl chloride or isobutyryl chloride.

By acylating with one of the above mentioned acid halides the isomeric 5-amino-N-methyl-1:9-pyrazole-anthrone of the formula

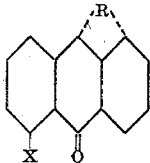

there are obtained dyestuffs which dye cellulose acetate silk orange-yellow tints of excellent fastness to light.

Example 3

25 parts of 5-amino-1:9-thiophene-anthrone are heated in 100 parts of chlorobenzene at the boil for ½ hour with 12.5 parts of dimethylaniline and 11.6 parts of isobutyryl chloride. The mixture is then cooled, and the dyestuff is filtered off. After being suitably pasted the dyestuff dyes cellulose acetate silk green-yellow tints which are very fast to light.

Instead of isobutyryl chloride there may be used an isomer thereof such as n-butyryl chloride or a homologous acid chloride such as acetyl chloride or propionyl chloride. The acid chloride may be formed in the same operation from the appropriate carboxylic acid, for example, by means of thionyl chloride. In order to increase their affinity the dyestuffs so obtained may be mixed with one another or with the dyestuffs of the other examples.

Example 4

0.5 part of the dyestuff obtained as described in the first paragraph of Example 1 is dissolved in 10 parts of sulfuric acid of 90 percent. strength at 0° C., and the solution is introduced into a mixture of ice and water and filtered. The filter cake so obtained is ground with 1 part of dried sulfite cellulose waste liquor in a roller mill. The suspension so obtained is added to a dyebath which contains in 3000 parts of water 9 parts of soap, 100 parts of well wetted cellulose acetate artificial silk are introduced at 40° C., the temperature is raised to 80° C., and dyeing is carried on for one hour at 80–85° C. The cellulose acetate artificial silk is dyed a yellow tint which is fast to light.

What is claimed is:

1. An anthrone derivative of the formula

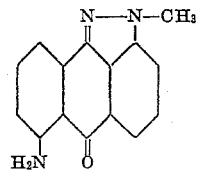

wherein X represents an acylamino radical, the acyl group of which is aliphatic monocarboxylic acid acyl containing at the most six carbon atoms, and R represents the atoms necessary to complete a five-membered heterocyclic ring selected from the group consisting of the isothiazole, thiophene and pyrazole rings.

2. An anthrone derivative of the formula

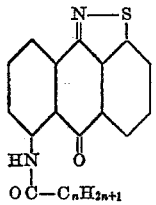

wherein $n$ represents a whole number of at the most 3.

3. An anthrone derivative of the formula

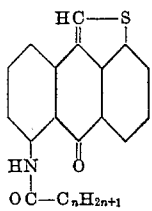

wherein $n$ represents a whole number of at the most 3.

4. An anthrone derivative of the formula

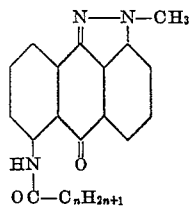

wherein $n$ represents a whole number of at the most 3.

5. The anthrone derivative of the formula

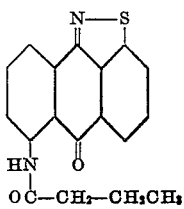

6. The anthrone derivative of the formula

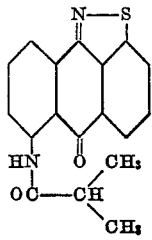

7. The anthrone derivative of the formula

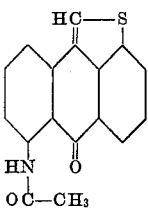

8. The anthrone derivative of the formula

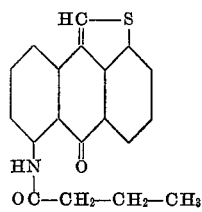

9. The anthrone derivative of the formula

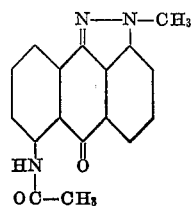

References Cited in the file of this patent
UNITED STATES PATENTS

| | | |
|---|---|---|
| 2,043,985 | Beard | June 16, 1936 |
| 2,099,673 | Beard | Nov. 23, 1937 |
| 2,149,433 | Grossman et al. | Mar. 7, 1939 |
| 2,363,042 | Buxbaum | Nov. 21, 1944 |

FOREIGN PATENTS

| | | |
|---|---|---|
| 650,057 | Germany | Sept. 9, 1937 |
| 709,690 | Germany | Aug. 23, 1941 |